July 24, 1956    W. J. ALBERSHEIM    2,756,390
PRECISION PHASE MEASURING CIRCUIT
Filed Oct. 4, 1950    2 Sheets-Sheet 1
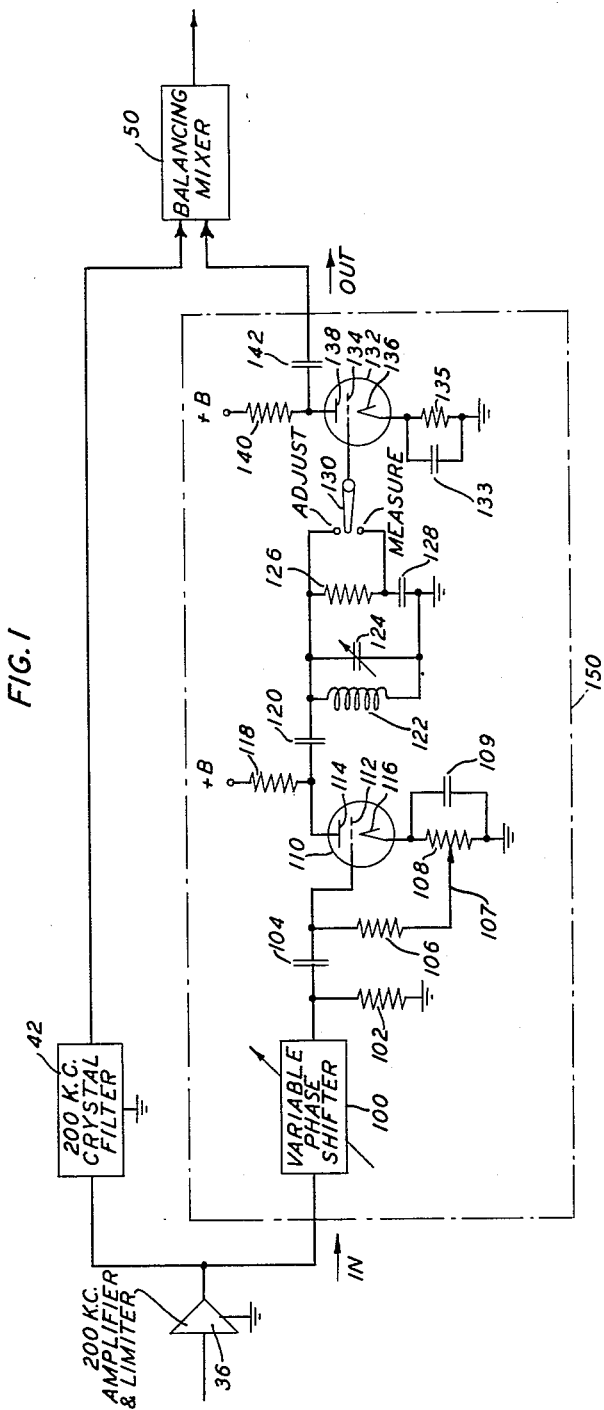
FIG. I
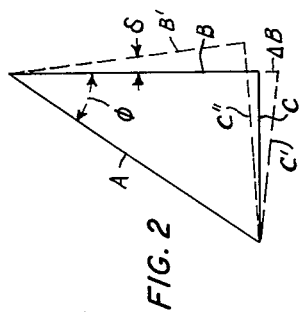
FIG. 2
INVENTOR
W. J. ALBERSHEIM
BY
H. O. Wright
ATTORNEY INVENTOR
W. J. ALBERSHEIM
BY
H. O. Wright
ATTORNEY United States Patent Office 2,756,390
Patented July 24, 1956

2,756,390
PRECISION PHASE MEASURING CIRCUIT

Walter J. Albersheim, Interlaken, N. J., assignor to Bell Telephone Laboratories, Incorporated, New York, N. Y., a corporation of New York Application October 4, 1950, Serial No. 188,335

4 Claims. (Cl. 324—89)

This invention relates to an improved method of and apparatus for precisely measuring small phase differences by the "vector difference" method. More particularly it relates to a method of and apparatus for reducing the effect of unwanted amplitude variations in a "vector difference" precision phase measuring circuit.

A principal object of the invention is to provide an improved "vector difference" type of measuring circuit for the precise measurement of small phase differences.

An additional object is to provide an improved method of and apparatus for minimizing the effects of small amplitude variations in circuits for measuring small phase variations by the "vector difference" method.

In circuits embodying the principles of the invention, the vector which includes the small phase variations to be measured is first adjusted to exact phase opposition and equal average amplitude with respect to a second reference or standard vector having a substantially constant amplitude and negligible phase variations. The first vector is then displaced in phase with respect to the second reference or standard vector by an angle $\phi$ and its amplitude is reduced by the factor $\cos \phi$ so that for the average value of the first vector the angle made by the difference vector, i. e. the vector joining the ends of the first vector and the second reference or standard vector (see Fig. 2 and explanation thereof below) is 90 degrees with respect to the first vector. From plane trigonometry, it is obvious that with an angle of $\phi$ within the limits of approximately 20 to 60 degrees, preferred values being approximately within the range of 30 to 45 degrees, small amplitude changes in the first vector will produce only negligible variations in the amplitude of the difference vector.

Prior to attempting the measurement of the small phase variations it is the practice in the art to pass the signals to be measured through a limiter circuit. Any of several limiter circuits, well known in the art, will reduce unwanted amplitude variations to a residue of approximately two per cent of the wanted signal amplitude but these residual amplitude variations are sufficiently great where, as in the case of circuits with which the apparatus of the present invention is intended to be used, it is desired to measure phase variations in the order of a few hundredths of a degree.

Heretofore it has been the practice to overcome the difficulty arising from the presence of the residual amplitude variations by multiplying the frequency of both the signal to be tested and the reference or standard signal by a large factor, such as 12, for example, which will have the effect of multiplying the small phase variations by the same factor without substantially affecting the magnitude of the unwanted residual amplitude variations and thus causing the magnitude of the phase variations to be sufficiently large to make practicable their measurement in the presence of the residual amplitude variations. This method, however, involves the use of a more complicated circuit including frequency multipliers for both the test signals and the reference or standard signal and a filter in the output circuit to eliminate unwanted harmonic frequencies generated in the frequency multipliers.

The method in accordance with the principles of the present invention, as described briefly above, involves only a simple circuit, which, as will become apparent hereinunder, requires only one double triode vacuum tube, a variable phase shifter, a simple switch and a few capacitors and resistors.

The principles and features of the invention will be more readily perceived in connection with the detailed description of preferred illustrative embodiments of the invention given below, and from the accompanying drawings, in which:

Fig. 1 shows a schematic diagram of one form of circuit embodying the principles of the invention;

Fig. 2 is a vector diagram employed in explaining the principles underlying circuits of the invention.

Figure 3:
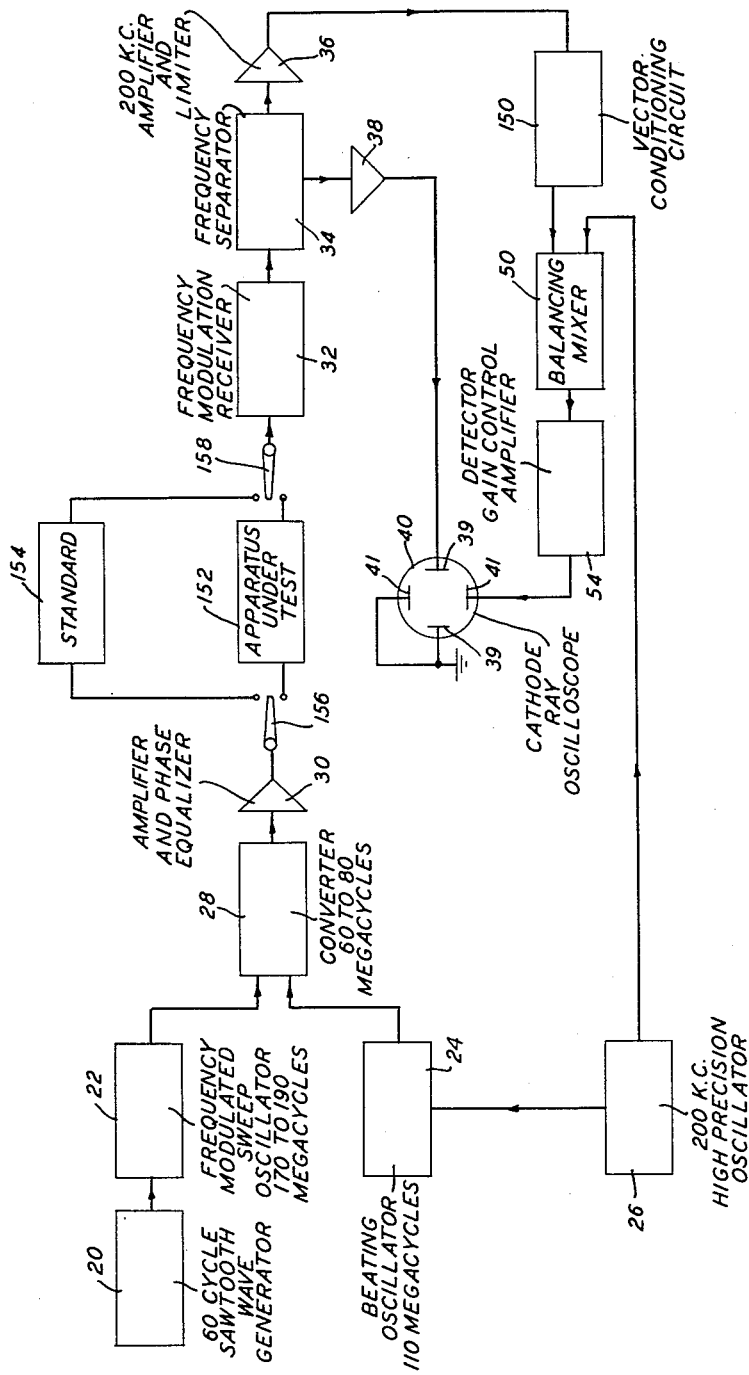
Fig. 3 shows a schematic diagram of a second form of circuit embodying the principles of the invention.

In more detail, in Fig. 1 a circuit of the invention is shown which is especially adapted to be incorporated into the circuit of the far end station of the envelope delay scanning system disclosed, described and claimed in the copending application, Serial No. 188,285, filed concurrently with this application on October 4, 1950, by J. C. Schelleng, assignor to applicant's assignee. The said copending Schelleng application matured into United States Patent 2,625,614, granted January 13, 1953. The invention of the Schelleng patent relates to envelope delay scanning systems which comprise delay distortion measuring systems adapted and arranged to display instantaneously the envelope delay versus frequency characteristics of complex high frequency electrical apparatus and communication systems. More particularly it relates to a method and apparatus especially adapted for providing instantaneous displays of the envelope delay versus frequency characteristics of physically and electrically long high frequency communication transmission systems wherein the reference signal is derived directly from the transmitted test signals and the necessity for an additional circuit to transmit a suitable reference signal from the near end station to the far end station of the system under test is eliminated.

The illustrative system shown in the drawing of the Schelleng patent and described in detail in the patent, comprises a near end station at which a signal which is periodically swept through the frequency range of 60 to 80 megacycles and is in turn modulated by a 200 kilocycle signal furnished by a high precision crystal oscillator, is impressed upon a transmission system the envelope delay of which it is desired to obtain and, at the far end of the transmission system, a far end station at which the above-mentioned composite signal is demodulated to obtain the 200 kilocycle signal with its sideband frequencies. A standard or reference signal is obtained at the far end station in accordance with the teaching of the patent by stripping the sideband frequencies from a portion of the 200 kilocycle signal by passing the portion through a narrow bandpass crystal filter and the envelope delay characteristic of the transmission system under test is obtained by comparing the relative phases of the stripped 200 kilocycle signal and the unstripped 200 kilocycle signal (i. e., the 200 kilocycle signal with its sideband frequencies) for recurrent sweeps of the 60 to 80 magacycle signal. As stated above, circuits of the present invention are especially adapted for incorporation into the circuit of the far end station of the system of the Schelleng patent and relate to an improved method of and apparatus for precisely measuring small phase differences by the "vector difference" method. As is well known to those skilled in the art, a vector is a complex entity representative of a directed magnitude, voltage vectors representing magnitude by their length and phase angle by the their direction. Numerous and comprehensive texts have long been published which deal exhaustively with vector analysis and vectorial representation generally. The illustrative over-all circuit of the Schelleng patent, modified to incorporate the vector conditioning circuit of the present invention and to include a separate connection to the source of high precision 200 kilocycle frequency to provide a reference signal, is shown in Fig. 3 of the drawings of the present application and will be described in detail hereinunder.

In the circuit of Fig. 1 of the present application, the 200-kilocycle amplifier and limiter 36, the 200-kilocycle crystal filter 42 and the balancing mixer 50 are, respectively, identical with like designated units of Schelleng's above-mentioned patent. As described in said patent the 200 kilocycle amplifier and limiter 36 is of conventional design and suitably amplifies and limits the 200 kilocycle signal and its sideband frequencies to remove unwanted amplitude modulation. As is further described in said patent, the 200 kilocycle crystal filter 42 is a very narrow band crystal filter passing only the single frequency of 200 kilocycles and effectively eliminating all sideband frequencies (200 kilocycles±60 C. P. S. and harmonics of the latter) adjacent to 200 kilocycle frequency which can be of the type employing piezoelectric crystals, well known to those skilled in the art. As is still further described in said patent, the balancing mixer 50 comprises a circuit in which the 200 kilocycle frequency together with its sidebands is compared with (or balanced against) the "stripped" 200 kilocycle frequency (output of filter 42) in accordance with the well known "phase opposition" method. The output of mixer 50 then comprises signals representing phase versus frequency variations of the complete circuit of the Schelleng patent over the 20 megacycle band. Schelleng's patent shows a phase variation measuring circuit arrangement employing frequency multipliers, the circuit being of the general type briefly described hereinabove.

The substitution of the circuit elements bearing designation numbers between 100 and 142, inclusive, of Fig. 1 in the present application, makes possible the elimination of the frequency multipliers 47 and 48 of Schelleng's circuit and in addition simplifies the problems of amplitude and phase adjustment. The simpler arrangements of the present invention make the use of the units 44, 46, and 52 of the Schelleng circuit also unnecessary.

It will be obvious to those skilled in the art that the principles and arrangements of the present invention are equally applicable to numerous other circuits where the precision measurement of small phase variations requires the virtual elimination of residual amplitude variations, the disclosure of the copending Schelleng application being referred to as illustrative of one, but by no means the only, advantageous use of said principles and arrangements. Fig. 3 of the present application, for example, shows a further application of the principles of this invention to a different modification of the circuit shown in the Schelleng application.

In Fig. 1 of the present application, variable phase shifter 100 can be, for example, of the type described in detail in United States Patent 2,004,613, granted June 11, 1935, to L. A. Meacham. Alternatively, it can be of the type disclosed in United States Patent 1,576,459, granted March 9, 1926, to G. W. Pierce, provided taps along the phase shifting network are provided at intervals to afford phase adjustment in 15-degree intervals, for example, by moving the contacting member of a multi-contact switch to successive positions connected to successive taps along the network.

Shunt connected resistor 102 provides a suitable output impedance, for example, 75 ohms, for variable phase shifter 100. Condenser 104 is a blocking condenser serving to connect the output of variable phase shifter 100, to the grid 112 of triode vacuum tube 110. Triode vacuum tubes 110 and 132 can, for example, be the two halves of a double triode vacuum tube of the type 2C51, Radio Corporation of America, also known as type 396A Western Electric Company, Incorporated.

Resistor 106 is a grid leak for the grid circuit of vacuum tube 110 and can have a resistance of one megohm, for example. Potentiometer type resistor 108 has its resistive element connected between cathode 116 of triode vacuum tube 110 and ground as shown and constitutes, therefore, a cathode bias resistor. The variable contacting member 107 provides adjustment for the effective grid to cathode bias voltage of the triode vacuum tube 110 and can be employed to accurately adjust the gain or amplification of vacuum tube 110. A by-pass condenser 109 provides an alternating current path around resistor 108.

The upper end of resistor 118 is connected for normal operation, to the positive terminal of a suitable source of supply voltage (not shown) the negative terminal of said source being grounded. The lower end of resistor 118 is connected to anode 114 of vacuum tube 110. Resistor 118 functions as an anode circuit coupling resistance between vacuum tube 110 and the portion of the circuit to the right of resistor 118, as shown.

Capacitor 120 is a blocking condenser passing the alternating current signals, but isolating the circuit including the grid 134 of triode vacuum tube 132 from the direct-current source to which the upper end of resistor 118 is connected.

The combination of retardation coil 122 and variable capacitor 124, connected in shunt relation with each other and with resistive elements 118 and 126, is shunted across the grid to ground circuit, or input circuit of vacuum tube 132, to afford a precisely controllable phase adjustment within limits, for example, of plus or minus 15 degrees, so that the phase of the signals, passing through the circuit including vacuum tubes 110 and 132, can be adjusted to exact phase opposition with respect to the reference or standard signal from the output of crystal filter 42 in the upper branch of the dual circuit, as will be discussed in further detail presently. If variable phase shifter 100 is of the continuously adjustable type of the Meacham patent, mentioned above, and is precisely calibrated, the precise adjustment afforded by the combination 122—124 may not be necessary and this combination can then be omitted.

The series-connected combination of resistor 126 and capacitor 128 is connected in shunt across the output circuit of vacuum tube 110 through the series blocking condenser 129 as shown. Both elements of this combination should have a high impedance at the signal frequency which in the case of the circuit of Fig. 1 is assumed to comprise a narrow band of frequencies centered about 200 kilocycles. By way of example, each element can have an impedance to a frequency of 200 kilocycles of approximately 100,000 ohms. As will be further explained, below, this series combination of resistance 126 and capacitor 128, in conjunction with two-position switch 130, constitutes means whereby, with switch 130 in its upper position, the average amplitude of the signal energy, passing through the circuit including vacuum tubes 110 and 132, can be adjusted by gain control potentiometer 108 to equal the amplitude of the signal from the output of filter 42, and the phase of the first-mentioned signal energy can be adjusted by phase shifter 100 (and combination 122—124, if required) to precise phase opposition with respect to the second-mentioned signal. By operating switch 130 to its lower position, after the above amplitude and phase adjustments have been made, the phase of the signal energy will be shifted by a predetermined angle $\varphi$ with respect to the signal from filter 42 and its amplitude will be reduced by the factor $\cos \varphi$. The value of the angle $\varphi$ will of course depend upon the relative impedance values of resistor 126 and capacitor 128. For example, if these two units are proportioned to have equal impedances to a frequency of 200 kilocycles, then the value of angle $\varphi$ will be 45 degrees and the amplitude of the voltage across capacitor 128 will be reduced by the factor cos 45 degrees relative to the voltage across the combination 126, 128 in series. Obviously by suitably proportioning the relative values of the impedances of resistor 126 and capacitor 128, the angle $\varphi$ can be given any value between 0 and 90 degrees and the voltage across capacitor 128 can be made equal to the total voltage across the combination of the two elements reduced by the factor cos $\varphi$. Obviously too, the capacitor 128 can be replaced by an inductor and an equivalent effect can then be obtained, the sole difference being that the angle $\varphi$ will represent a phase displacement of the opposite sign to that obtained by a capacitor of like impedance. As previously stated, preferable values of $\varphi$, for the purposes of the present invention, are those between approximately 30 degrees and approximately 45 degrees, inclusive.

Triode vacuum tube 132 and its immediately associated circuits, including cathode bias resistor 135, by-pass capacitor 133, anode coupling resistor 140, the upper end of which is connected to the positive terminal of a suitable source of anode potential (not shown) the negative terminal of which source is grounded, and blocking condenser 142, constitute an output amplifier stage, the functions of which are to contribute to the over-all amplification of the circuit including vacuum tubes 110 and 132, and to present a suitable impedance to the input of balancing mixer 50. The over-all circuit enclosed by the dash line designated 150, is, for the purposes of this application, called a "vector conditioning circuit."

As previously stated, units 36, 42 and 50 can be identical with the like numbered units, respectively, of Fig. 1 of the above-mentioned copending application of J. C. Schelleng, said units being described in detail above and in said application.

In Fig. 2 a vector diagram representative of the operation of circuits of the invention is shown. The side A of the diagram represents the standard or reference voltage vector such as that obtained from filter 42 of Fig. 1.

With the switch 130 of Fig. 1 in its upper position, phase shifter 100 and if necessary the capacitor 124 of Fig. 1 are adjusted together with gain control potentiometer 108 of Fig. 1, until a minimum output is obtained from balancing mixer 50 of Fig. 1, indicating that the voltages from the upper and lower branches of the circuit of Fig. 1 are in phase opposition and of substantially identical amplitude. Switch 130 of Fig. 1 is then thrown to its lower position which will cause the vector resulting from the voltage output of vacuum tube 132 to be displaced by a predetermined angle $\varphi$ from the reference or standard vector as represented in Fig. 2 by vector B. As previously stated the magnitude of vector B will also be reduced by the factor cos $\varphi$ and, therefore, in Fig. 2 the vector C, representing the vector difference between vectors A and B, will form an angle of 90 degrees with vector B.

From inspection of Fig. 2 it is obvious that a small amplitude variation, i. e., a small change in length $\Delta B$, of vector B will result in a difference vector C', for example, the length of which will be negligibly different from the length of vector C.

On the other hand, a small increase $\delta$ in the phase angle $\varphi$ will result in a difference vector C'' the length of which will be perceptibly increased with respect to vector C.

It is therefore apparent that a circuit arrangement such as that shown in Fig. 1, when operated in conformance with the principles of the present invention as described in detail above, will substantially eliminate the effects of small amplitude variations and at the same time retain full sensitivity with respect to small changes in phase.

The following mathematical analysis of the vector diagram of Fig. 2, indicates the degree of precision obtainable with circuits operated in accordance with the principles of the invention.

Defining symbols:

A is the reference vector in volts
B is the modulated vector in volts
C is the resultant (or difference) vector in volts
$\varphi$ is the reference phase angle in radians or degrees
$\delta$ is the instantaneous phase modulation in radians or degrees
$a$ is the relative instantaneous amplitude error

*Analysis*

$$B \text{ (average)} = A \cos \varphi \tag{1}$$

$$B \text{ (instantaneous)} = (1+a)A \cos \varphi \tag{2}$$

$$a = \frac{B \text{ (inst.)} - B \text{ (av.)}}{B \text{ (av.)}} \tag{3}$$

$$C = A \sin \varphi + A(1+a) \cos \varphi \sin \delta + jA \cos \varphi [a + (1+a)(\cos \delta - 1)] \tag{4}$$

$$\frac{C}{A \sin \varphi} = 1 + \cot \varphi (1+a) \sin \delta + j \cot \varphi (a \cos \delta + \cos \delta - 1) \tag{5}$$

$$\text{For } a \ll 1 \text{ and } \delta < 1 \tag{6}$$

$$\frac{C}{A \sin \varphi} \doteq 1 + (\delta + a\delta) \cot \varphi + ja \cot \varphi \tag{7}$$

$$\left|\frac{C}{A \sin \varphi}\right| \doteq 1 + \cot \varphi \left[\delta + a\delta + \frac{a^2 \cot \varphi}{2(1+2\delta \cot \varphi)}\right] \tag{8}$$

$$\Delta C = A \cos \varphi \left[\delta + a\delta + \frac{a^2 \cot \varphi}{2(1+2\delta \cot \varphi)}\right] \tag{9}$$

The error in the measurement of $\delta$ is $$\epsilon \doteq a\delta + \frac{a^2 \cot \varphi}{2(1+2\delta \cot \varphi)} \tag{10}$$

the first term of which is proportional to $\delta$. The first term is nearly constant and decreases slightly with increasing $\delta$ Let $$\varphi \geq \frac{\pi}{6} \text{ radians } (30°) \tag{11}$$

$$\delta \leq .08\pi \text{ radians } (14.3°) \tag{12}$$

corresponding to a measuring range of $\pm 200$ millimicroseconds in the equipment described in the above-mentioned copending application of Schelleng $$a \leq 0.02 \tag{13}$$

Then the percentage error corresponding to the fixed term in (10) is 2%. The fixed error is $$< \frac{a^2 \cot \varphi}{2} \leq 3.5 \cdot 10^{-4} \text{ radian } (.02°) \tag{14}$$

or less than .28 millimicrosecond in the equipment of the copending application.

From the above analysis it is obvious that the arrangements of the invention employed in conformance with the principles of the invention are capable of extreme accuracy.

In Fig. 3, an additional circuit arrangement illustrating the application of the principles of the invention is shown in block schematic diagram form.

This circuit is a modification of the circuit shown in Fig. 1 of the abovementioned patent of J. C. Schelleng and the units 20, 22, 24, 26, 28, 30, 32, 34, 36, 38, 40 50, and 54 are identical, respectively, with the similarly designated units of Fig. 1 of the Schelleng Patent, mentioned above. These units are described in detail in that patent in substantially the following manner. Frequency modulated swept oscillator 22 is periodically swept through a predetermined frequency range such, for example, as the range between 170 megacycles to 190 megacycles, inclusive, by means of a voltage control wave which can, for example, be of sawtooth form and be supplied by a sawtooth wave generator 20. The control wave can, for example, have a repetition rate of 60 cycles per second.

Oscillator 22 can, for example, be of the type employing the well known "velocity variation" type of vacuum tube in which the frequency of the oscillator can be readily swept through a frequency range such as is mentioned above by way of example, by simply varying the voltage applied to the repeller anode of the tube over a suitable range of voltages.

Alternatively, the desired frequency sweep of oscillator 22 can be effected by applying the sawtooth wave from generator 20 to a reactance tube connected into the frequency determining or tuning circuit of oscillator 22, in accordance with principles well understood by those skilled in the art.

Sawtooth wave generator 20 can, likewise, be of any of the numerous types well known to the art and its frequency of repetition can, in the majority of the types well known to those skilled in the art, be varied over a wide range as, for example, between 25 and 100 cycles per second, if so desired. A reliably stable frequency of 60 cycles per second (or a frequency harmonically related to 60 cycles) is generally available from a commercial power supply and, therefore, usually can be conveniently used to synchronize the action of the sawtooth wave generating circuit and for similar purposes.

Since the range of frequencies between 60 and 80 megacycles, inclusive, is convenient for use in transmitting communication signals such as video television signals or multichannel carrier telephone or carrier telegraph signals or the like, a beating oscillator 24 is employed in Fig. 1 and its output, having a frequency of 110 megacycles, is introduced together with the output of oscillator 22 into converter 28 which, by combining the two inputs, provides an output which is varied regularly or cyclically under control of the wave from generator 20, over the range of 60 to 80 megacycles, inclusive. Numerous appropriate types of beating oscillators for such use are well known to those skilled in the art.

To provide a suitable reference signal, and, as well, a test signal to which will be imparted, during transmission through the apparatus or system to be tested, the phase variations which it is desired to measure, the 110 megacycle frequency of beating oscillator 24 is itself modulated by the 200 kilocycle output of a high precision constant frequency crystal oscillator 26, before being combined in converter 28 with the output of sweep amplifier 22.

In order to carry out the phase comparison with sufficient accuracy to measure small variations of delay time, the frequency of the 200 kilocycle modulating signal or "testing signal" must remain extremely constant. For this reason, a highly stable crystal oscillator 26 which can be of any of the several types well known in the art, is chosen as the source of the 200 kilocycle signal. The 200 kilocycle modulation introduced by oscillator 26 will, of course, appear as a modulation of the 60 to 80 megacycle output of converter 28.

In accordance with the usual practice in the art, the output of converter 28 is further amplified and predetermined phase adjustments, calculated to compensate for the average phase distortion of the system, or apparatus to be tested are effected, as may be deemed desirable, by amplifier and phase equalizer 30, the output of which is introduced into the input or near end of the system or apparatus to be tested. Numerous suitable amplifying and phase equalizing units are well known and have been used extensively in the art.

The output, or far end, of the system, or the apparatus, to be tested is connected to frequency modulation receiver 32. The 60 to 80 megacycle signal is demodulated by receiver 32 and its output is connected to frequency separator 34 which can, for example, comprise a combination of a low pass filter suppressing frequencies above about 5000 cycles and a band-pass filter passing 200 kilocycles and sideband frequencies on each side of the 200 kilocycle carrier, the band passed being typically 10 kilocycles wide and being centered about 200 kilocycles.

The filters of the frequency separator 34, for the above-described purposes, can take any of the numerous forms well known to those skilled in the electrical wave filter art.

The 60-cycle sawtooth wave will pass through the low pass filter portion of separator 34 and be amplified in sawtooth wave amplifier 38 to a suitable amplitude to be employed as the sweep wave for cathode ray oscilloscope 40, the output of amplifier 38 being impressed across the horizontal deflecting plates 39 of said oscilloscope, as shown. This obviously provides a frequency scale which is independent of the path (or test apparatus) between the near end and far end stations.

The 200-kilocycle signal and its sideband frequencies are passed by the band-pass portion of frequency separator 34 to a conventional amplifier and limiter 36 where they are suitably amplified and limited to remove unwanted amplitude modulation.

The output signals from balancing mixer 50 are detected and adjusted in amplitude in detector amplifier 54 to an appropriate average value for display as vertical deflections on cathode ray oscilloscope 40. The curve then traced by the beam of oscilloscope 40 will represent the instant envelope delay of the system or apparatus being tested, over the range of 60 to 80 megacycles. Since the scanning rate is 60 times per second, any substantial variations in envelope delay with time are immediately apparent.

In Fig. 3 of the present application, block 150 is the circuit enclosed in a dash line in Fig. 1 of the present application, bearing the same designation number. Block 152 represents a piece of apparatus such as a delay equalizer the envelope delay characteristic of which is to be measured, block 154 represents a standard piece of apparatus having the required envelope delay characteristic to which the apparatus 152 should conform, and switches 156, 158 permit either unit 152 or unit 154 to be connected between units 30 and 32 of the testing circuit so that deviations of the characteristic of apparatus 152 from that of the standard 154 can readily be observed by comparison of their respective envelope delay traces appearing on oscilloscope 40. Switches 156, 158 can, of course, readily be arranged to be operated synchronously with the 60-cycle sawtooth wave generator so that alternate traces are of the characteristics of standard 154 and apparatus under test 152, the two traces then being superimposed on the screen of oscilloscope 40 to further facilitate comparison of the respective characteristics.

Since in the circuit of Fig. 3 it is assumed that all the apparatus units are assembled in proximity to each other, the reference frequency, from which the standard vector is obtained, can be taken directly from the 200-kilocycle high precision oscillator 26 to the balancing mixer 50 as shown and no 200-kilocycle crystal filter (filter 42 of Fig. 1 of the Schelleng application) is required for the circuit of Fig. 3 of the present application.

It will be at once apparent to those skilled in the art that numerous and varied additional circuits can readily be devised to operate in accordance with the principles of the present invention and no attempt has here been made to exhaustively cover all such possibilities. The embodiments described in detail above are illustrative, only, since the principles of the invention are obviously capable of embodiment in numerous other ways.

What is claimed is:

1. A circuit for measuring small phase variations by the vector difference method said circuit comprising, a source of a stable reference voltage vector, a source of a signal voltge vector including small phase varations to be measured and residual amplitude variations to be eliminated, means, electrically connected to said first-mentioned and said second-mentioned sources, for indicating the algebraic sum of said reference and said signal voltage vectors, means for aligning the phase of said signal voltage vector into phase opposition to said reference vector and adjusting the average amplitude of said signal voltage vector to equal that of said reference vector, means for shifting the phase of said signal voltage vector by from 20 to 60 degrees and adjusting its amplitude to the ratio expressed as the cosine of the angle by which it is shifted whereby said indicating means provides indications of small phase variations of said signal voltage vector.

2. A circuit for measuring small phase variations by the vector difference method, said circuit comprising a source of a stable reference voltage vector, a source of a vector signal voltage vector including small phase variations to be measured and residual amplitude variations to be eliminated, means electrically connected to said first-mentioned and said second-mentioned sources, for indicating the algebraic sum of said reference and said signal voltage vectors, means for adjusting said signal voltage vector to like amplitude and to phase opposition with respect to said reference vector, means for displacing the average phase of one of said vectors by from 20 to 60 degrees relative to the other of said vectors and adjusting the average amplitude of the displaced vector to the ratio expressed as the cosine of the angle by which it is displaced whereby said indicating means provides indications of small phase variations of said signal voltage vector.

3. The circuit of claim 1, in which the said means for shifting the phase of said signal voltage vector by from 20 to 60 degrees and adjusting its amplitude to the ratio expressed as the cosine of the angle by which it is shifted comprises a voltage dividing circuit consisting of a resistive impedance and a reactive impedance connected electrically in series, the voltage across one of said impedances having a phase angle difference of from 20 to 60 degrees with respect to that of the total voltage impressed across said voltage dividing circuit and an amplitude differing from that of said total voltage by the ratio expressed as the cosine of the said phase angle difference.

4. The circuit of claim 3, in which said voltage dividing circuit comprises a resistive impedance connected electrically in series with a capacitance.

References Cited in the file of this patent

UNITED STATES PATENTS

| | | |
|---|---|---|
| 1,914,192 | Bedford | June 13, 1933 |
| 2,084,836 | Buschbeck | June 22, 1937 |
| 2,290,657 | Vedder | July 21, 1942 |
| 2,411,876 | Hansen | Dec. 3, 1946 |
| 2,416,517 | Farrow | Feb. 25, 1947 |